Feb. 1, 1944. W. GOERTZEN 2,340,657
SPREADING UNIT
Filed Oct. 4, 1941 3 Sheets-Sheet 3
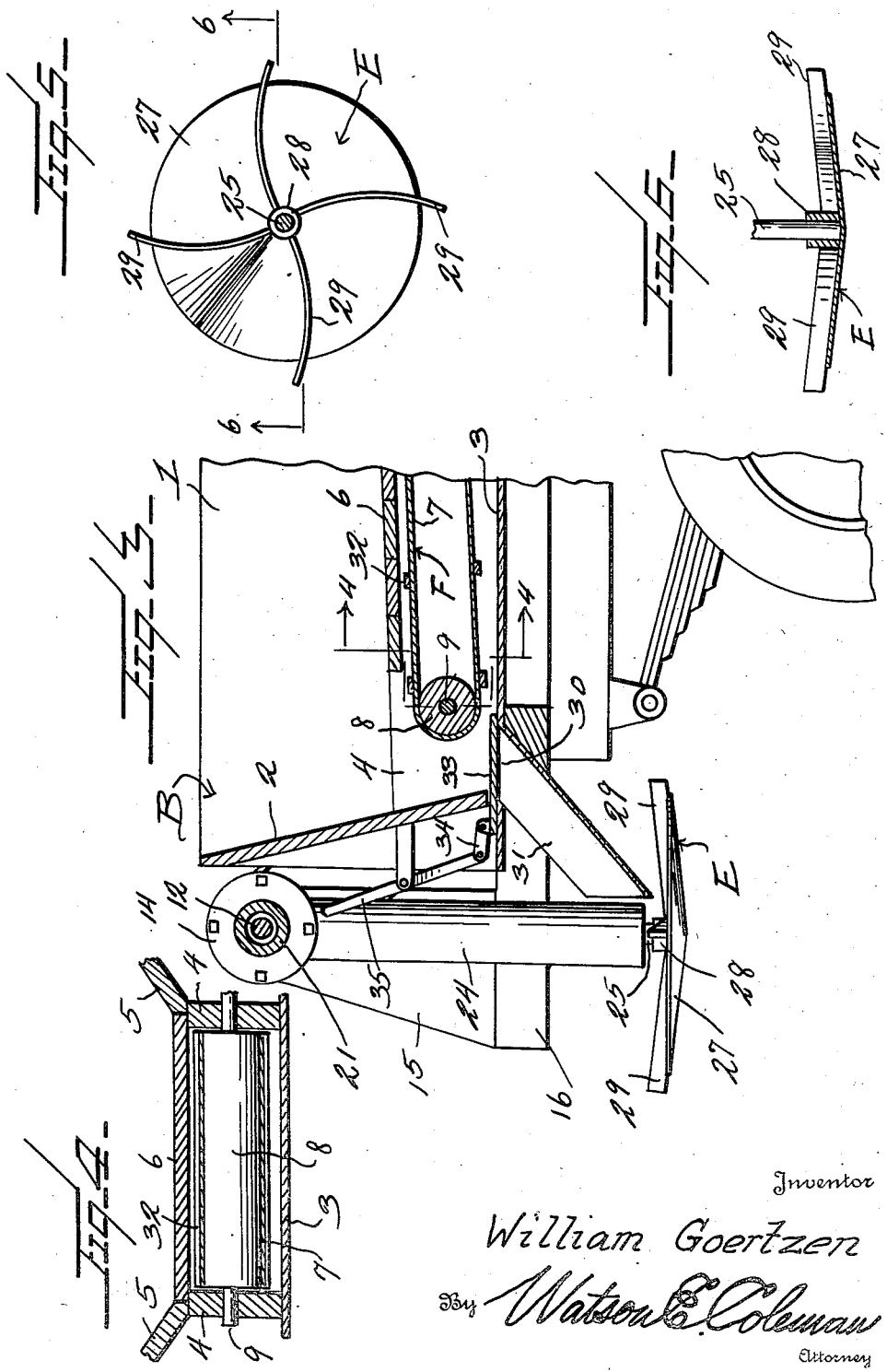
Inventor
William Goertzen
By Watson E. Coleman
Attorney Patented Feb. 1, 1944

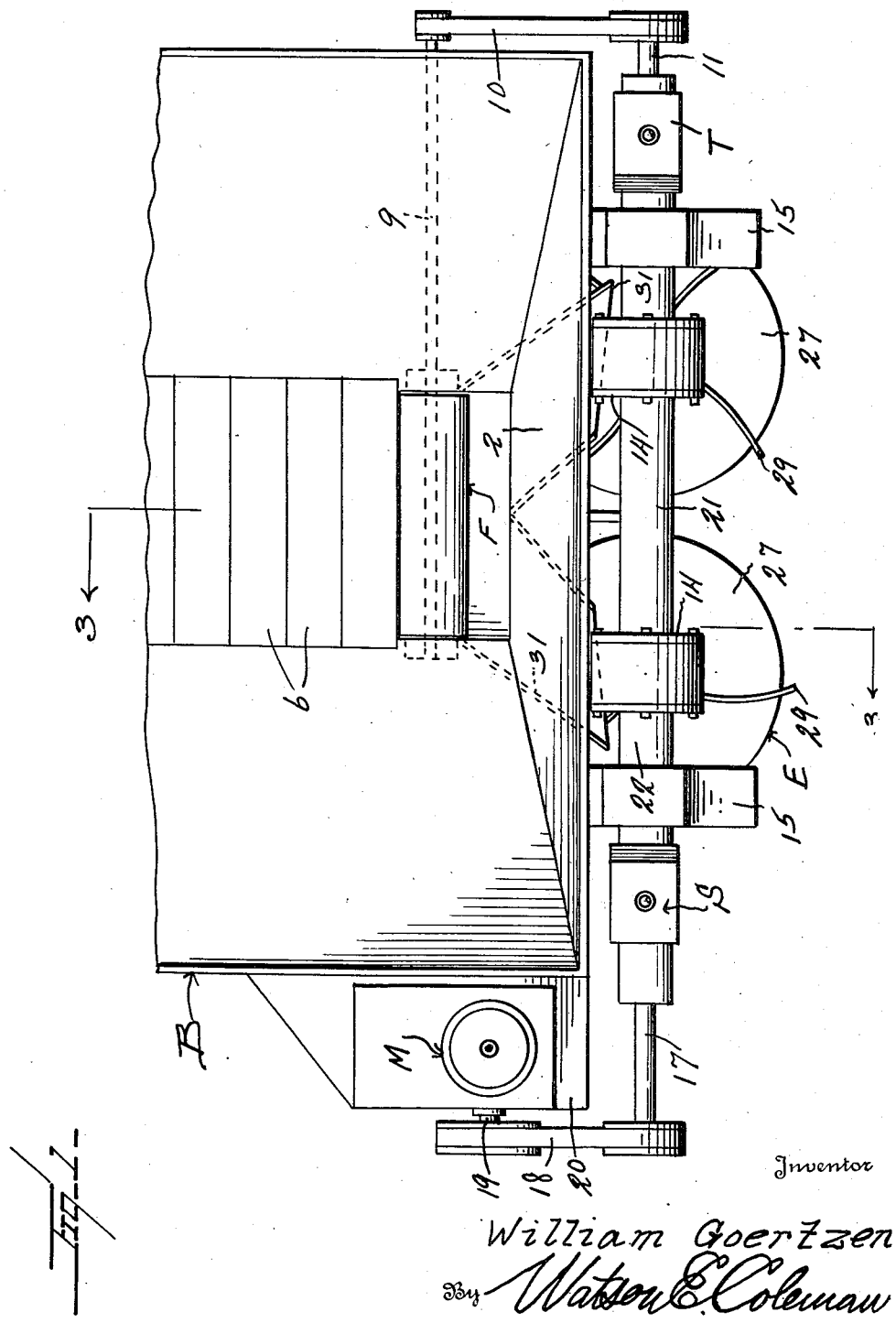

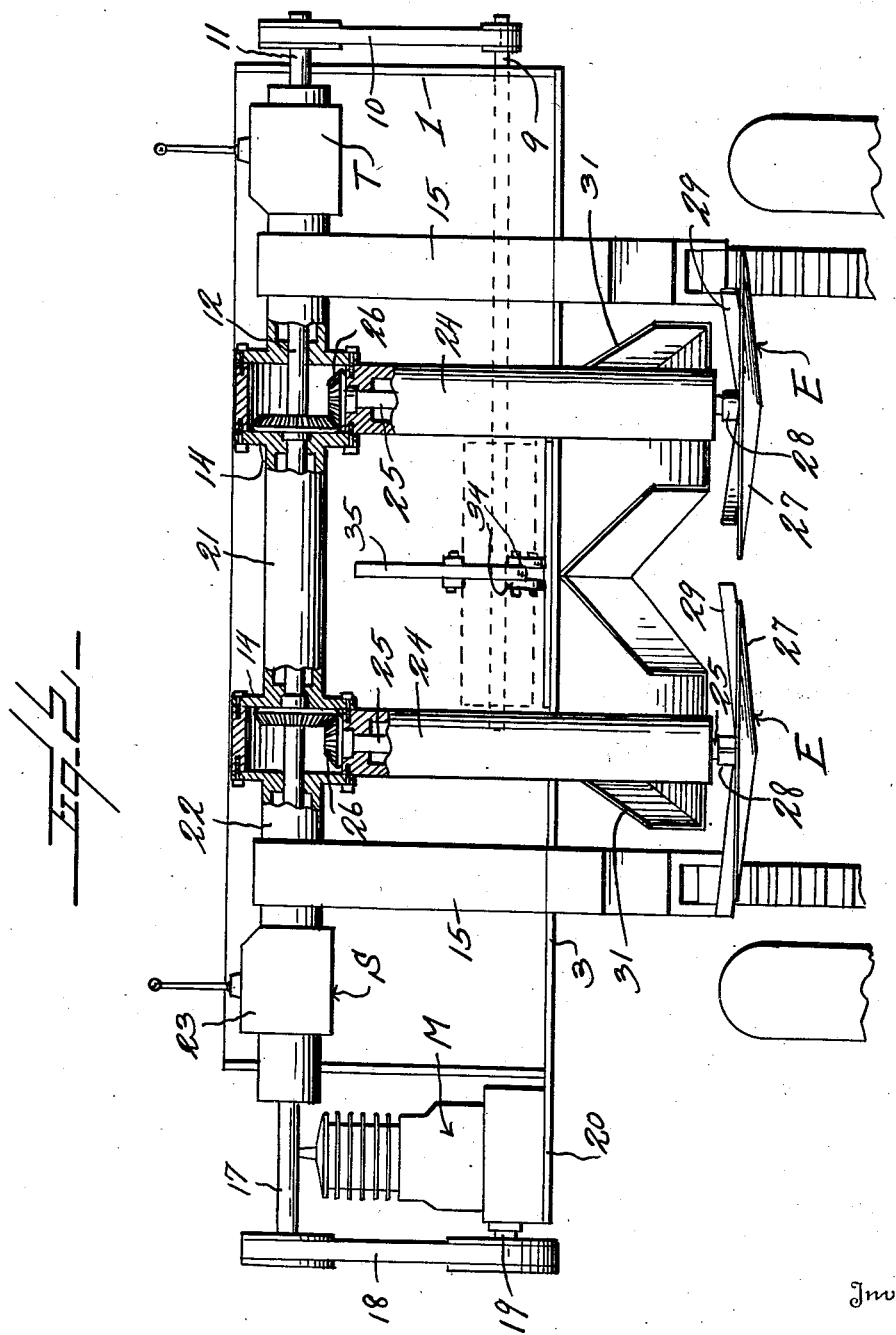

2,340,657

UNITED STATES PATENT OFFICE 2,340,657

SPREADING UNIT

William Goertzen, Pasadena, Calif., assignor of one-half to Aram Peter Ohanneson, Shafter, Calif.

Application October 4, 1941, Serial No. 413,665

2 Claims. (Cl. 275—8)

This invention relates to a spreading unit, and it is an object of the invention to provide a device of this kind of a traversing type including rotating scattering means upon which is delivered in regulatable quantities the material to be spread.

It is also an object of the invention to provide an apparatus of this kind particularly designed and adapted for use in the spreading of fertilizer, gypsum, and kindred material, and wherein the apparatus includes rotary scattering means together with a movable feeding element, and wherein the speed of the rotary means and the speed of the movable feeding element may be regulated, one independently of the other, as the requirements of practice may necessitate, and also to provide an apparatus of this kind wherein the rotary spreading means and the movable feeding element are operated from a common source of power.

An additional object of the invention is to provide an apparatus of this kind of a portable type and which may be transported in any manner preferred, and wherein the movable parts of the apparatus are driven from a source of power entirely independent of the power used in the transporting of the apparatus.

The invention consists in the details of construction and in the combination and arrangement of the several parts of my improved spreading unit, whereby certain important advantages are attained, as will be hereinafter more fully set forth.

In order that my invention may be the better understood, I will now proceed to describe the same with reference to the accompanying drawings, wherein:

Figure 1 is a view in top plan of a spreading unit constructed in accordance with an embodiment of my invention, the body of the unit being in fragment;

Figure 2 is a view in rear elevation of the device as illustrated in Figure 1, with portions broken away;

Figure 3 is a vertical sectional view taken substantially on the line 3—3 of Figure 1, with parts in elevation;

Figure 4 is an enlarged fragmentary sectional view taken substantially on the line 4—4 of Figure 3;

Figure 5 is a view in top plan of one of the scattering members herein embodied, the operating shaft therefor being in section; and Figure 6 is a sectional view taken substantially on the line 6—6 of Figure 5.

As disclosed in the accompanying drawings, B denotes the rear end portion of a portable body which is adapted to be transported in any manner preferred. This body B comprises, as illustrated in the accompanying drawings, side walls 1, a downwardly and inwardly inclined rear or tail wall 2, and a bottom or bed wall 3. The bed wall 3, at the central portion thereof, has mounted thereon the elongated parallel sills 4 spaced apart a desired distance and preferably equidistantly spaced beyond opposite sides of the transverse center of the bottom or bed wall 3. Coacting with the side walls 1 of the body B and the sills 4 are the downwardly and inwardly inclined aprons 5 which are provided to assure the material within the body B being properly delivered upon the upper stretch of the endless feeding member F travelling between the sills 4. The sills 4 are substantially coextensive in length with the length of the body B and supported upon the sills 4 are the removable cross members or boards 6 which initially close the top of the space between the sills 4 from the head end of the body B to a point closely adjacent to the discharge or delivery end of the member F.

It is to be stated at this time that as the material within the body B is discharged therefrom the boards or cross members 6 are successively removed. The provision of this sectional and removable false floor or bottom as afforded by the cross members or boards 6 eliminates the necessity of having a man continually shoveling the material within the body on to the member F, and also assures the proper feeding of the material to be spread without wastage.

The member F constitutes a conveyor and, as herein disclosed, comprises an endless belt 7 of required length and width and each end portion of this member or conveyor F passes around a guide roller or drum 8 properly positioned between and supported by the sills 4. The rear roller or drum 8, as illustrated in Figure 3, of the drawings, is positioned forwardly of but in close proximity to the rear or tail end wall 2 of the body B. The roller or drum is fixed to rotate with a shaft 9 which extends at one end beyond one of the side walls 1 and said extended end portion of the shaft 9 is in driving connection, as at 10, with a shaft 11 comprised in a transmission T associated with a drive shaft 12. This shaft 12 is rotatably supported by and extends through the boxings 14 at the upper end portions of the upstanding posts 15 comprised in the structure of the brackets 16, herein disclosed as secured to and extending rearwardly from the bottom or bed wall of the body B. The transmission T, as herein disclosed, is carried by the upper portion of an adjacent post 15. The transmission T is of a conventional type and a detailed description and illustration thereof is unnecessary, although it is to be stated that it is preferred that the transmission T be of a character to allow the shaft 12 to drive the shaft 11 at three different speeds. Through the medium of the transmission T it is believed to be obvious that the upper stretch of the belt or conveyor 7 may be caused to travel towards its discharge end at any one of such three speeds, as the requirements of practice may necessitate.

The shaft 12, at the end portion thereof remote from the transmission T, is in driving connection through a second transmission S which includes an outwardly extending shaft 17. This shaft 17 is in driven connection, as at 18, with the power shaft 19 of a motor M mounted upon an outstanding table or platform 20 carried by the bottom portion of the body B and which, as illustrated in the accompanying drawings, is a continuation of the bottom or bed wall 3. This motor M may be as desired, but is preferably of an internal combustion type. The boxings 14 are connected by an intermediate housing 21 through which the shaft 12 is directed, and said boxings 14 also have secured thereto the outstanding housings 22 which are directly engaged with the posts 15 of the brackets 16. The housings 22 include in their structure the required casing 23 for the transmission T or S.

Depending from the boxings 14 are the elongated tubular housings 24 which have disposed axially therethrough the shafts 25. The upper end portion of each of these shafts 25 is in driven connection, as at 26, with the shaft 12, while the lower or opposite end portion of each of the shafts extends below its associated housing 24. As is illustrated in Figure 2 of the drawings, the boxings 14 are spaced apart in a direction transversely of the body B a distance sufficient to place the shafts 25 to one side of the space between the sills 4, in which space the feeding member F is positioned.

The lower end portion of each of the shafts 25 has fixed to rotate therewith a spreading element E. This element E, as herein disclosed, comprises a concavo-convex disk or plate 27 of desired dimensions with its concaved face upwardly disposed. Arranged on the upper or concaved face of the disk or plate 27 and extending from the hub 28 thereof are the throwing or scattering blades or vanes 29. As is clearly illustrated in the accompanying drawings, these blades 29 are each disposed lengthwise on a predetermined curvature and is of a length to extend a slight distance beyond the periphery of the disk or plate 27. Each of these blades or vanes 29 also has its lower longitudinal edge in close contact with the upper surface of the disk or plate 27.

As is clearly illustrated in Figure 2, it is to be noted that the driving connections between the shaft 12 and the shafts 25 are such as to cause the shafts to rotate in unison but in opposite directions, with the shafts rotating in a direction outwardly with respect to the adjacent end of the body B so that the material discharged upon the elements E will be scattered or broadcast in opposite directions, or in directions beyond the opposite sides of the body B. The rear or tail end of the bottom or bed wall 3 of the body B is provided with a discharge opening 30 through which depends the downwardly and rearwardly inclined diverging chutes 31, each of which terminates above and in close proximity to an element E and discharges thereon. The material within the body B as carried rearwardly by the upper stretch of the belt 7 will be discharged through the opening 30 upon the chutes 31, and the chutes will discharge such material upon the elements E with the resultant scattering or broadcasting of the material. To facilitate the desired feeding of the material by the belt or conveyor 7, the outer face thereof at predetermined points therealong is provided thereacross with the cleats 32 or equivalent elements.

As herein disclosed, the discharge opening 30 is under control of a slide valve 33 which is operatively connected, as by a link 34, with a hand lever 35 carried by the rear end or tail wall 2 of the body B.

The transmission S may be of any type preferred, and for which reason a detailed description and illustration thereof is also believed to be unnecessary. It is stated, however, that this transmission S is also to be of a type to allow for three different speeds for the shaft 17. By providing means for varying the speed of rotation of the shaft 25, as through the medium of the transmission S, and for varying the travel of the feeding member F, as through the transmission T, it is believed to be apparent that effective control may be had not only of the feeding of the material to the elements E but of the regulation of the throw of the material by said elements E.

It is believed to be obvious from the foregoing that the operation of the feeding member F, as well as the scattering elements E, is in no way dependent upon any source of power other than the independent source afforded by the motor M, and it is to be further pointed out that the rate of travel of the feeding member F may be varied as desired independently of the speed of rotation of the elements E, thus assuring a maximum of efficiency of the spreading unit dependent upon the amount of material desired to be scattered, and which scattering or spreading is, therefore, accomplished with a minimum of wastage.

It is also to be pointed out that the spreading unit as herein disclosed is one which can be employed with equal facility with different kinds of fertilizer as well as with fertilizer which may be either wet or dry.

From the foregoing description it is thought to be obvious that a spreading unit constructed in accordance with my invention is particularly well adapted for use by reason of the convenience and facility with which it may be assembled and operated.

I claim:

1. A spreading unit for fertilizer and the like including a body having a bottom wall provided with a discharge opening, a shaft supported by the body to extend transversely thereof, a pair of shafts supported to extend downwardly from the first shaft below said bottom and each being at its lower end adjacent said opening, a driving connection between the pair of shafts and the first shaft, a scattering element supported upon the lower end of each of the pair of shafts to be turned thereby and in a position to receive material from said opening, movable feeding means within the body for moving material within the body to said opening, means for delivering power to one end of the first shaft, means for regulating the rotational speed of the pair of shafts, means for transmitting rotary power from the other end of the first shaft to the movable feeding means, and means for regulating the speed with which the feeding means is operated by the said first shaft.

2. A spreading unit for fertilizer and the like including a body having a bottom wall provided with a discharge opening, a shaft supported by the body to extend transversely thereof, a pair of shafts supported to extend downwardly from the first shaft below said bottom and each being at its lower end adjacent said opening, a driving connections between the pair of shafts and the first shaft, a scattering element supported upon the lower end of each of the pair of shafts to be turned thereby and in a position to receive material from said opening, movable feeding means within the body for moving material within the body to said opening, means for delivering power to one end of the first shaft, a change speed mechanism interposed in the first shaft between the pair of shafts and said power delivering means for regulating the speed of rotation of the pair of shafts, an operative coupling between the other end of the first shaft and said movable feeding means, and a change speed mechanism interposed in the first shaft between the pair of shafts and said operative coupling by which the speed of operation of said feeding means may be controlled.

WILLIAM GOERTZEN.